(12) United States Patent
Minert

(10) Patent No.: US 11,146,690 B2
(45) Date of Patent: Oct. 12, 2021

(54) SYSTEMS AND METHODS FOR DYNAMIC VOICE-OVER-INTERNET-PROTOCOL ROUTING

(71) Applicant: INCONTACT INC., Sandy, UT (US)

(72) Inventor: Brian Minert, Orem, UT (US)

(73) Assignee: INCONTACT INC., Sandy, UT (US)

( * ) Notice: Subject to any disclaimer, the term of this patent is extended or adjusted under 35 U.S.C. 154(b) by 143 days.

(21) Appl. No.: 16/686,810

(22) Filed: Nov. 18, 2019

(65) Prior Publication Data

US 2021/0152695 A1 May 20, 2021

(51) Int. Cl.
| | |
|---|---|
| *H04L 12/26* | (2006.01) |
| *H04M 7/00* | (2006.01) |
| *H04M 3/22* | (2006.01) |
| *H04M 7/12* | (2006.01) |
| *H04L 12/841* | (2013.01) |
| *H04L 29/06* | (2006.01) |
| *H04L 12/24* | (2006.01) |
| *H04L 12/853* | (2013.01) |

(52) U.S. Cl.
CPC ...... *H04M 7/0084* (2013.01); *H04L 41/5012* (2013.01); *H04L 43/087* (2013.01); *H04L 47/2416* (2013.01); *H04L 47/283* (2013.01); *H04L 65/608* (2013.01); *H04L 65/80* (2013.01); *H04M 3/2227* (2013.01); *H04M 3/2236* (2013.01); *H04M 7/127* (2013.01)

(58) Field of Classification Search
CPC . H04L 41/5012; H04L 43/087; H04L 47/283; H04L 65/80; H04L 65/608; H04L 47/2416; H04M 7/0084; H04M 3/2227; H04M 7/127; H04M 3/2236
See application file for complete search history.

(56) References Cited

U.S. PATENT DOCUMENTS

| | | | | |
|---|---|---|---|---|
| 9,843,606 | B1 * | 12/2017 | Vendrow | H04L 65/403 |
| 2013/0329595 | A1 * | 12/2013 | Scholz | H04L 43/08 370/252 |
| 2016/0164942 | A1 * | 6/2016 | Reddappagari | H04L 65/602 348/14.13 |
| 2017/0054784 | A1 * | 2/2017 | Panattu | H04L 65/80 |
| 2017/0180430 | A1 * | 6/2017 | Ahmed Assem Aly Salama | H04M 7/0084 |
| 2019/0141193 | A1 * | 5/2019 | Lee | H04L 43/0864 |

* cited by examiner

*Primary Examiner* — Lan-Huong Truong
(74) *Attorney, Agent, or Firm* — Haynes and Boone, LLP

(57) ABSTRACT

Embodiments described herein provide a dynamic voice over Internet Protocol (VoIP) audio quality management mechanism in real time, e.g., when a VoIP call is ongoing. Specifically, when a VoIP call has unsatisfactory audio quality, e.g., due to packet loss, jitter, etc., the dynamic VoIP audio quality management mechanism may redirect the VoIP traffic from the previous endpoint that initiates the VoIP session to a different endpoint within the same carrier. Upon the endpoint redirection, a new call leg is established, allowing re-negotiation or re-configuration of VoIP parameters. The re-negotiated or re-configured VoIP parameters may then be used to conduct the remainder of the VoIP call to improve the audio quality.

22 Claims, 6 Drawing Sheets

SYSTEMS AND METHODS FOR DYNAMIC VOICE-OVER-INTERNET-PROTOCOL ROUTING

TECHNICAL FIELD

The present disclosure relates generally to communication networks for audio calls, and more specifically to a system and method for dynamic voice-over-Internet-Protocol (VoIP) routing.

BACKGROUND

The voice over Internet Protocol (VoIP) delivers voice communications and multimedia sessions over Internet Protocol (IP) networks. Specifically, the VoIP network expects a smooth flow of Real Time Protocol (RTP) packets that contains the digitalized audio data over interconnected IP networks. To ensure end-to-end voice communication quality, a minimum transmission delay of the RTP packets is usually expected. Traditionally, communication on the IP network is perceived as less reliable in contrast to the circuit-switched public telephone network because VoIP does not provide a useful network-based mechanism to ensure that data packets are not lost and are delivered in sequential order. Voice, and all other data, travel in packets over IP networks with a fixed maximum capacity. Thus, due to possible network congestion, VoIP may be more prone to audio degradation than traditional circuit-switched systems. When RTP packets are dropped or delayed in VoIP networks, or when packet routing produces unacceptably lengthy delays, the audio call quality is reduced.

Accordingly, a need exists for methods and systems for dynamic VoIP routing to improve audio quality.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
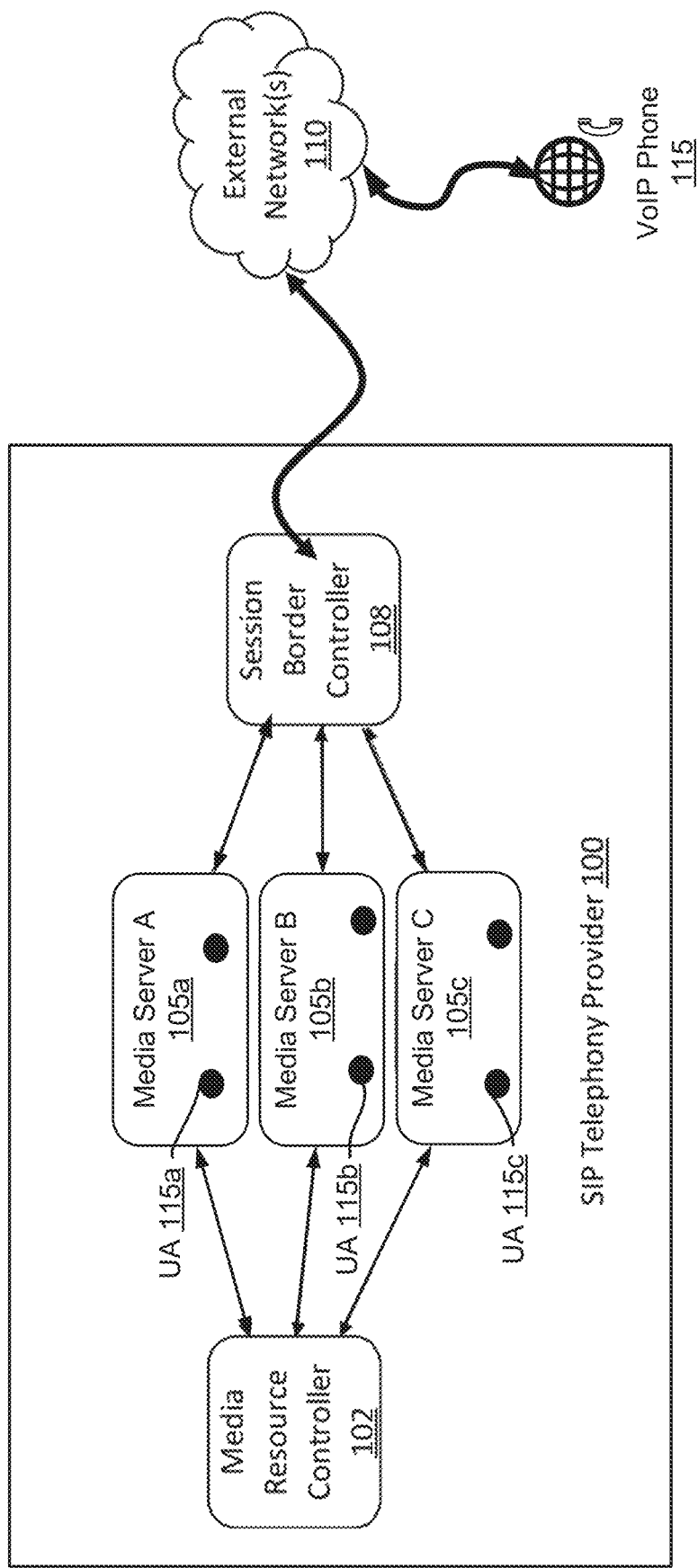
FIG. 1 is a simplified diagram of a VoIP provider, e.g., a session initiation protocol (SIP) telephony provider according to aspects of the present disclosure.

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one of ordinary skill in the art.

In this description, specific details are set forth describing some embodiments consistent with the present disclosure. Numerous specific details are set forth in order to provide a thorough understanding of the embodiments. It will be apparent, however, to one of ordinary skill in the art that some embodiments may be practiced without some or all of these specific details. The specific embodiments disclosed herein are meant to be illustrative but not limiting. One of ordinary skill in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

In view of the need to improve VoIP audio quality when RTP packet loss or packet routing delay occurs, some existing systems adopt certain call-quality metrics to monitor VoIP audio quality, e.g., rated by human listeners, to monitor the VoIP audio quality. For example, listeners can rate a phone call using a Mean Opinion Score (MOS) system based on their subjective perception of call quality. When the listener-rated quality metric is dissatisfactory, the call controller may adjust call parameters to improve call quality for subsequent calls. Such mechanism requires data collection from human users, based on which the system gathers call quality feedback to take actions to improve call quality. Additionally, human user feedback can be subjective and thus the call quality metric may not be consistent over time. Thus, the quality improvement cycle may be both inefficient and costly, as the efforts for quality improvement only occur after a phone call has been completed and a human user has submitted his or her rating of the call, which process is incapable of retroactively remedying the undesirable audio quality of the respective call that has already happened, resulting in negative user experience of VoIP service.

Embodiments described herein provide a dynamic VoIP audio quality management mechanism in near real time, e.g., while a VoIP call is ongoing. Specifically, a communication request having a destination for a second end user may be received to establish a communication session between the first end user and the second end user. A first routing path between the first end user and the second end user is determined. The communication session is then established via the first routing path in accordance with a set of VoIP parameters. A first audio quality metric is then determined associated with a first plurality of VoIP data packets that are exchanged with the first end user via the first routing path during the communication session. In response to determining that the first audio quality metric fails to satisfy a condition when comparing to an audio quality threshold, a second plurality of VoIP data packets is redirected from the first end user through a second routing path while the communication session is ongoing.

For example, VoIP parameters such as the RTP socket type, payload size, coding or compression algorithm, etc., are usually negotiated during the VoIP call setup. When a VoIP call has unsatisfactory audio quality, e.g., due to packet loss, jitter, etc., the dynamic VoIP audio quality management mechanism of the present disclosure may redirect the VoIP traffic from the previous endpoint that initiates the VoIP session to a different endpoint. Upon the endpoint redirection, a new call leg is established, allowing re-negotiation or re-configuration of VoIP parameters. The re-negotiated or re-configured VoIP parameters may then be applied to the call leg for the remainder of the VoIP call to improve the audio quality.

FIG. 1 is a simplified block diagram of a VoIP provider, e.g., a session initiation protocol (SIP) telephony provider 100 according to aspects of the present disclosure. In a call control entity of VoIP conversations, SIP may be used as the call control protocol for call setup and signaling. Other call control protocols such as H.323 and/or other proprietary protocols may also be used. Such VoIP call control protocols may have the capability to select or negotiate call and media attributes, such as but not limited to the RTP socket type (for example, Transport Control Protocol (TCP) or User Datagram Protocol (UDP)), and/or the like. As shown in FIG. 1, a SIP telephony provider 100 is used for call control under the SIP call control protocol, but other call control protocols may be used in similar ways as described below.

In some embodiments, the SIP telephony provider 100 includes one or more media servers 105a-c. Each media server 105a-c hosts one or more SIP user agents (UAs) 115a-c. The media servers are further illustrated in FIG. 2. Each UA 115a-c may be a combination of a UA sender that may be a client application sending a SIP request, and a UA listener that may receive a SIP request from another UA housed either with one of the media servers 105a-c, or elsewhere on the network, such as VoIP phone 115. The SIP UA 115a-c allows peer-to-peer calls to be made using a client-server protocol.

The SIP telephony provider 100 further includes a media resource controller (MRC) 102, which may also be known as a soft switch, which is communicatively coupled to each media server 105a-c. The MRC 102 may coordinate the initiation, termination or redirecting of the endpoints of calls from one UA to another, where the UAs 115a-c are optionally hosted on different media servers.

The SIP telephony provider 200 further includes a session border controller 108 (SBC), which is communicatively coupled to and receive media traffic from one or more media server 105a-c, and in turn forwards the media traffic to an external network 110. For example, the external network 110 may include, but is not limited to Internet Service Providers (ISPs), internet telephony carriers, or other IP carriers, all of which may exchange media traffic with other UAs connected to the Internet (e.g., as further shown at 404 in FIG. 4). The external network 110 may be connected to an end user, e.g., a VoIP phone 115, which may be operated to initiate a SIP session to place a VoIP call.

In some embodiments, conferencing servers may be separate or may be integrated with one or more media servers. For example, in a carrier-based example, each caller in a call or conference call may originate or terminate in one of the media servers 105a-c. For example, a caller in Germany may place a call to India. The call may initially terminate on media server A 105a, which may then place a call to India and connect the audio between the two calls. This embodiment is referred to as a call with two call legs. A conference call man have many call legs, all of which may have their audio mixed in one or more media or conference servers.

In some embodiments, the MRC 102 may receive a SIP request to initiate a call and may assign a UA associated with one of the media servers, e.g., media server A 105a, to conduct the call. A UA of Media server A 105a may in turn launch and join a VoIP session and send VoIP packets to the SBC 108, which may forward the VoIP packets to the external network 110 as the VoIP session is ongoing. Media server A 105a may monitor the quality of media traffic as VoIP packets pass through media server A 105a. For example, when jitter or packet loss occur at media server A 105a, the quality of the VoIP call for the associated UA may be negatively impacted.

Existing call-control protocols are mostly limited in what parameters or configuration may be changed during the call. Most call control protocols require call configuration parameters to be negotiated as part of the call setup, some of which may no longer be modified during the call. For example, the initially-negotiated call parameters may include, but not limited to the RTP socket type (e.g., TCP or UDP), the audio encoding or compression algorithm used, packet payload size (e.g., the number of byes in the packet user for VoIP data), the endpoint IP address, a selection of ISP, and/or the like.

Specifically, the RTP socket type may affect packet flow, depending on the configuration of intermediary routers and firewalls of the ISPs (e.g., the external network 110) being routed through. Routers have different rules for how congestion is handled, especially in situations when they are configured to discard UDP packets when congestion is encountered. A change of packet transport type may take advantage of a more-favorable or more-reliable intermediate router rule. On the other hand, packet loss may affect TCP packets far more than UDP packets, as the TCP packet stream may usually retry a dropped packet and the repeated retry for successive packet drops may last up to a several seconds. Such delay can degrade the audio quality of an on-going VoIP conversation.

In addition, the audio encoding or compression algorithm used and packet payload size may affect the bandwidth used by the ensuing RTP stream. For example, since packet header sizes are often fixed, a larger packet size will reduce the percentage of packet header overhead. If the socket routing cannot be changed during an on-going call under the call control protocol, a change of the encoding, compression or payload size may improve packet throughput outcomes.

In some embodiments, the endpoint IP address may determine the routing between endpoints and may determine which IP carrier or ISP to use. Different ISPs have different amounts of available bandwidth, e.g., as the VoIP packets go through the external network 110, which may affect the call quality as well. The MRC 102 may be configured to signal the SBC 108 for control of the selection of external ISP or VoIP carrier (e.g., external network 110) made by the SBC 108, or the SBC may be configured to enable such choices. This is especially true for cases where MRC 102 determines that the CQM of one or more calls that share a common carrier, ISP, or route, shows the need to improve call quality, in which case MRC 102 may invoke endpoint redirection for some or all such calls to route them through a different carrier, ISP, or route.

In some embodiments, MRC 102, or the UAs on each media servers 105a-c may monitor the call quality. Various factors may be considered to evaluate and monitor the audio quality of the VoIP call, including packet transport factors. For example, the flow of VoIP packets may be monitored by both VoIP endpoints (e.g., UAs 215a-c further shown in FIG. 2) via RTCP, which can report packet count, octet count, and irregular packet arrival intervals (called "Jitter") to MRC 102 or system controller. In conjunction with associated timestamps, these reported artifacts may be used to calculate round-trip travel times, packet loss, rate of packet loss, and other information useful for evaluating the health of audio-data transfer.

For example, a conversation quality metric (CQM) may be calculated based on the various factors to measure the quality of a VoIP call, which may take the form of a numeric score, referred to herein as the conversation quality metric score (CQMS). The CQMS may be calculated based on any combination of a round-trip travel time, the rate of packet loss, jitter magnitude, etc. For instance, the CQMS may be defined in a way that a higher score means worse audio quality. The jitter and packet loss may be averaged across RTCP reports during a 5-second sampling interval. Each millisecond of jitter in excess of 20 ms adds 1 point to the CQMS, and each lost packet adds 1 point to the CQMS. A CQMS above a threshold, e.g., 15, 20, etc., may be considered candidates for Quality Improvement Attempt (QIA).

In other examples, other audio quality metrics may be used, e.g., the audio quality metric may be defined to be proportional to the audio quality of the conversation, and a higher score indicates better audio quality. When the audio quality metric is lower than a threshold, QIA may be triggered.

In some embodiments, the CQMS threshold may be statistically configured based on factors such as carrier, destination characteristics (e.g., country, region, area code, etc.). Thresholds may be dynamically configured based on factors that can be reported or measured such as network bandwidth usage reports, etc.

In some embodiments, as any transport or media changes intended to improve call quality cannot be made at a high rate of change, due to the time and computing overhead necessary to make changes of call configuration parameters, the CQMS may be calculated as the average of the reported quality metrics over time. For example, a 5-second interval (which is configurable by SIP telephony provider 200) may be used to average the audio quality.

To improve the quality of an in-process VoIP call, embodiments described herein provide a mechanism to dynamically change call parameters during calls that suffer from lower quality, to achieve improved call audio quality for the remainder of the call. In one implementation, SIP messages such as Reinvite, Hold and Unhold may be used to change a codec and/or other configurations to modify a set of parameters. For endpoint redirection, the set of parameters may include, but are not limited to the RTP socket type, encoding/compression algorithm, and the packet payload size when the call is in progress. In other words, upon endpoint redirection, a new call or a new call leg is created, thus allowing new negotiation of call parameters. The endpoint redirection, which has been used for operations such as call transfers or joining a conference call, may be used to redirect VoIP packets to a different media server, when audio degradation is observed at the original media server, as further described in relation to FIG. 3.

Figure 2:
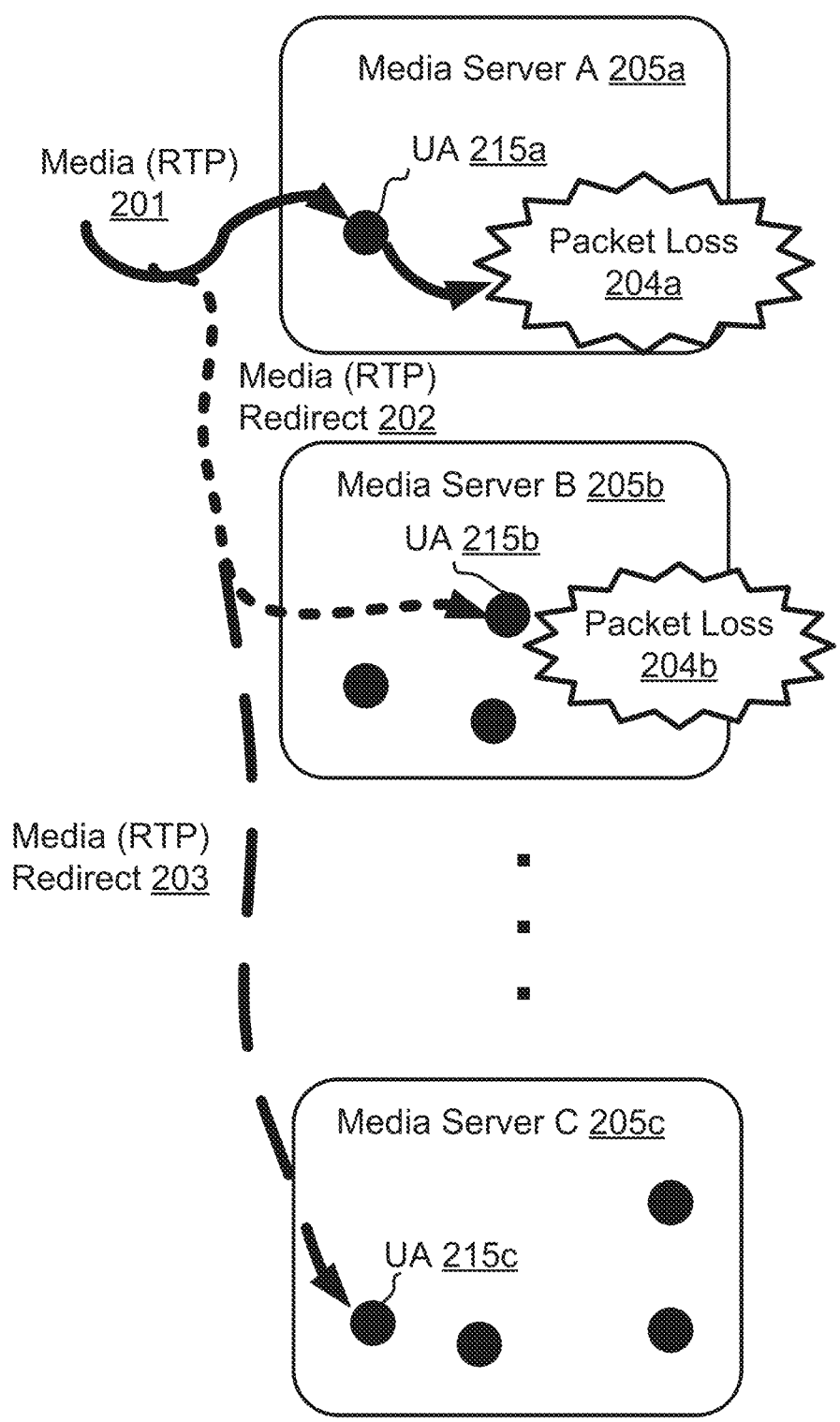
FIG. 2 is a simplified process diagram of an embodiment of redirecting media data through a different media server at the SIP telephony provider shown in FIG. 1, according to aspects of the present disclosure.

FIG. 2 is a simplified process diagram of an embodiment of redirecting media data through a different media server at the SIP telephony provider shown in FIG. 1, according to aspects of the present disclosure. The media servers 205a-c shown in FIG. 2 may correspond to the media servers 105a-c in the SIP telephony provider 100 shown in FIG. 1.

In some embodiments, MRC 102, as shown in FIG. 1, may direct media traffic, e.g., RTP packets 201, through UA 215a of media server A 205a. When severe packet loss 204a is observed at media server A 205a, the call quality may suffer. In this case, MRC 102 may conduct an endpoint redirection operation to redirect the media traffic 201.

In an endpoint redirection operation, one endpoint directs the other endpoint to reconnect to a new (third) endpoint. As shown in FIG. 2, the endpoint, e.g., UA 215a in media server A 205a, in conversation with an endpoint on the far end (e.g., the VoIP phone 115 connected through external network 110 as shown in FIG. 1), may redirect this other endpoint to UA 215b in media server B 205b. Media traffic 201 is then redirected to UA 215b at media server B 205b, which in turn forwards the media traffic to the external network 110. The redirection thus establishes a new call, or a new call leg, which may be completed with a new negotiation of endpoint parameters. In this way, the operators of the SIP telephony provider 100 in FIG. 1 may change normally unchangeable parameters of a call as long as a call redirection to a different endpoint has occurred. In other words, configuration parameters such as the RTP socket type, the audio encoding or compression algorithm used, packet payload size, the endpoint IP address, a selection of ISP, etc., may be changed upon endpoint redirection during the call, such that the on-going call may resume with the redirected endpoint and re-negotiated/modified call parameters that may improve the call quality. Specifically, the ownership of multiple configurable UAs 215a-c allows for SIP telephony provider 100 to redirect the far end of a call to another of its own UAs, thus recapturing the call and performing the same services for the redirected call as it would have for the original call.

An example sequence of events to implement an endpoint redirection may work as follows. When a quality improvement attempt (QIA) has been triggered by a call quality metric that falls below the configured target threshold, UA 215a issues a redirect command to the far end and attempts to negotiate the use of a lower-bandwidth codec and/or a larger packet payload size in the hopes that the bandwidth reduction may improve call quality. However, in this case, the use of this lower-bit-rate codec may itself reduce call quality due to the reduced bit rate, but the tradeoff may still offer some improvement in audio quality.

Similarly, even after media traffic 201 has been redirected to UA 215b in media server B 205b, as shown by the dotted line (media redirect 202), if severe packet loss 204b is observed at media server B 205b, or the call quality metric after the redirect 202 is still unacceptable, MRC 102 may further redirect the media traffic 203 to another UA 215c in media server C 205c. For example, MRC 102 may detect that a QIA has been triggered on UA 215b in media server B 205b. Upon further RTCP examination, MRC 102 may identify packet loss 204b at media server B 205b as the reason of QIA trigger. The MRC 102 then issues a Target Refresh (endpoint redirection) command to VoIP Phone 115 such that the call on UA 215b may be redirected to UA 215c on media server C 205c, as illustrated by the dashed line representing the media redirection 203 redirected from the dotted line representing media traffic 202 that was directed to UA 215b at media server B 205b. In the meantime, with the endpoint redirection, the newly formed call leg through UA 215c may have the socket type changed to TCP, such that TCP packets will not be discarded by intermediate routers that may have been previously configured to discard UDP packets when the router output queues reached their maximum length.

In some embodiments, MRC 102 may monitor the call quality and continue redirecting the media traffic to a different endpoint and/or modifying call parameters upon endpoint redirection until the call quality is acceptable, e.g., when a call quality metric is satisfactory. In another embodiment, MRC 102 may only redirect the media traffic for a maximum-allowable number of times and may select the endpoint or parameters that yield the best call quality metric.

In some embodiments, a change of call, transport or media parameters upon an endpoint redirection (e.g., following 202 or 203) may be chosen randomly in the attempt to improve call quality. In another embodiment, the selection of VoIP parameters to be changed, the order in which they are changed, and what other call attributes (such as carrier or route usage, call origination area, call destination area, etc.) are used to determine VoIP parameter modifications may be pre-defined. For example, as different areas of the world differ in transport quality and bandwidth availability, Call Detail Records (CDRs) or other historical call data may be available to the MRC 202 or the telephony management system. Such data may include call attributes such as call quality metrics, routing or carrier usage, call origins, and termination data. Such data may include the dialed number and the number of the dialing party, the date and time the call began and the duration of the call. Origin, termination and carrier information are examples of information that may be used to identify or imply information about the areas of origin and termination.

Quality metrics by area, carrier, or other factors may be maintained by the MRC 202 or telephony management systems. These may be kept in combination with the attributes of the call, or portion of a call, for which those call attributes applied. For example, a CDR for a call from the U.S. to England might have started with TCP using the G.711 Voice Coder and Decoder (vocoder) and experienced a quality metric of 7 (out of 10). The call may have changed characteristics to UDP with G.711 for a quality metric of 6, followed by a third set of characteristics of TCP with G.726 ADPCM (at an encoding rate of 32 Kbps) for a quality metric of 9. A database or CDR analyzer may track which characteristic or combination of characteristics have worked best between a given pair (or set, in the case of call conferencing) of call endpoints. For example, there may be a strong correlation between higher call quality and one particular carrier for calls between Germany and India, e.g., data analysis may predict that the best call quality between Germany and India is achieved using the carrier inContact, with UDP as the socket type and G.726 ADPCM as the vocoder. In a similar manner, several set of characteristics, in the order of best-to-least predicted quality, may result from analysis from historical call data.

Figure 3A:
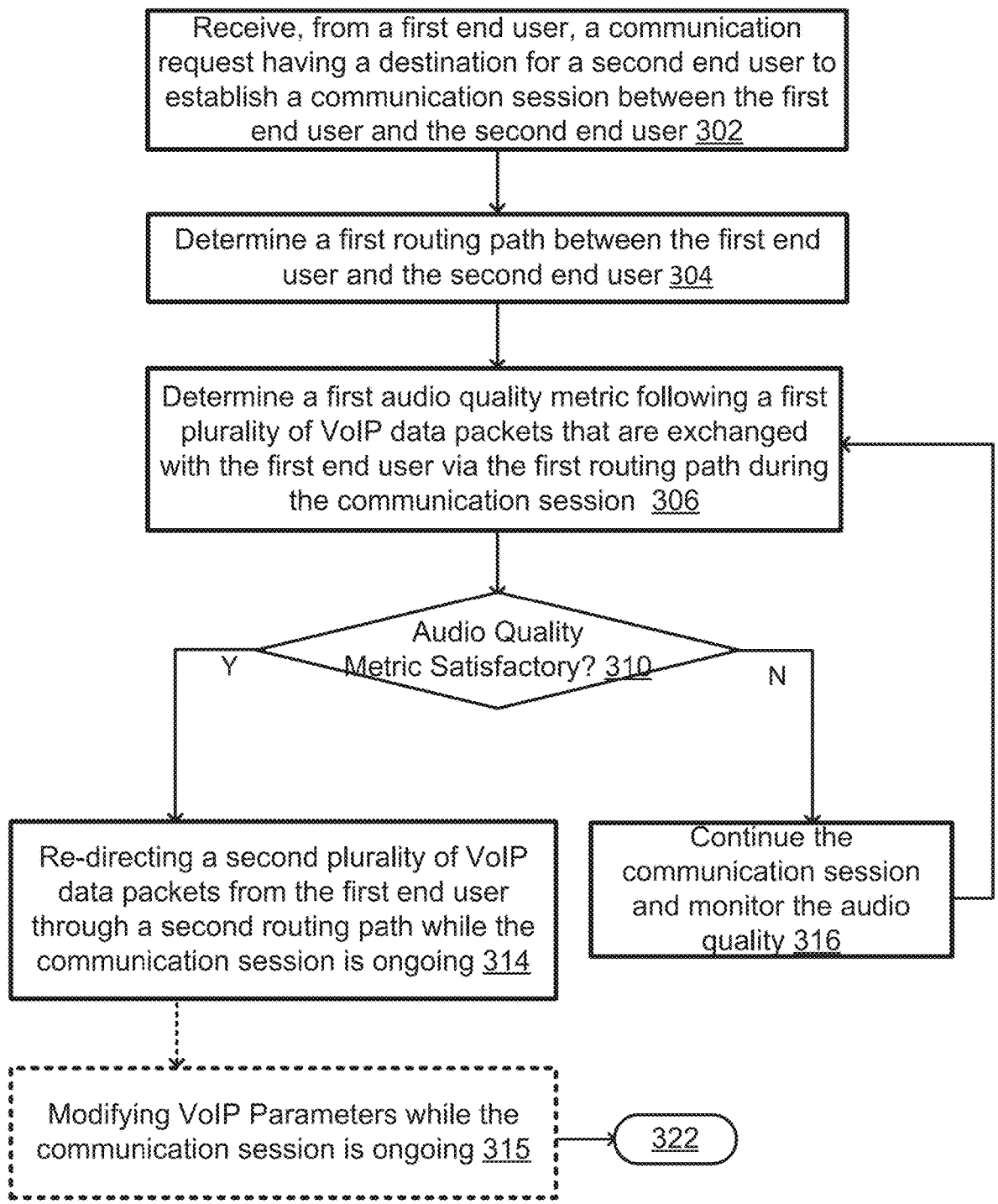
FIGS. 3A-3B provide a simplified logic flow diagram of an embodiment showing a method of dynamic VoIP audio quality management via redirecting media data, according to aspects of the present disclosure.
Figure 3B:
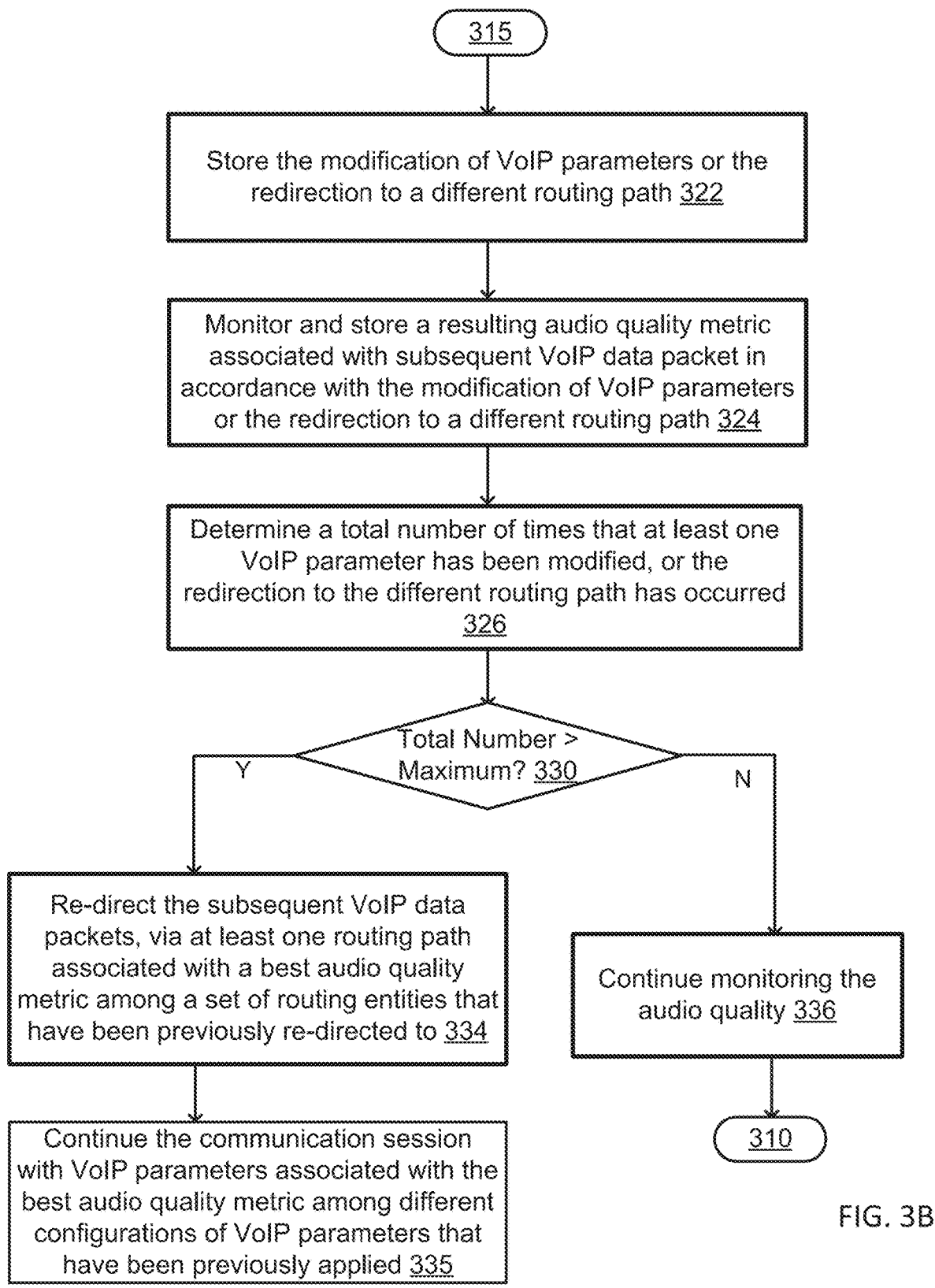

FIGS. 3A-3B provide a simplified logic flow diagram of an embodiment showing a method 300 of dynamic VoIP audio quality management via redirecting media data, according to aspects of the present disclosure. Steps of the method 300 can be executed by a computing device (e.g., a processor, processing circuit, and/or other suitable component) of a computing device or other suitable means for performing the steps. For example, the method 300 may be performed by the MRC 102 shown in FIG. 1. For another example, the method 300 may be implemented at the VoIP provider 402 in FIG. 4. For another example, a computer system, such as the computer system 500 further discussed in FIG. 5, may utilize one or more components, such as the processing component 504, network interface component 512, cursor control component 518, input component 516, bus component 502, system memory component 506, storage component 508, and/or the like, to execute the steps of method 300. As illustrated, the method 300 includes a number of enumerated steps, but aspects of the method 300 include additional steps before, after, and in between the enumerated steps. In some aspects, one or more of the enumerated steps may be omitted or performed in a different order.

Figure 4:
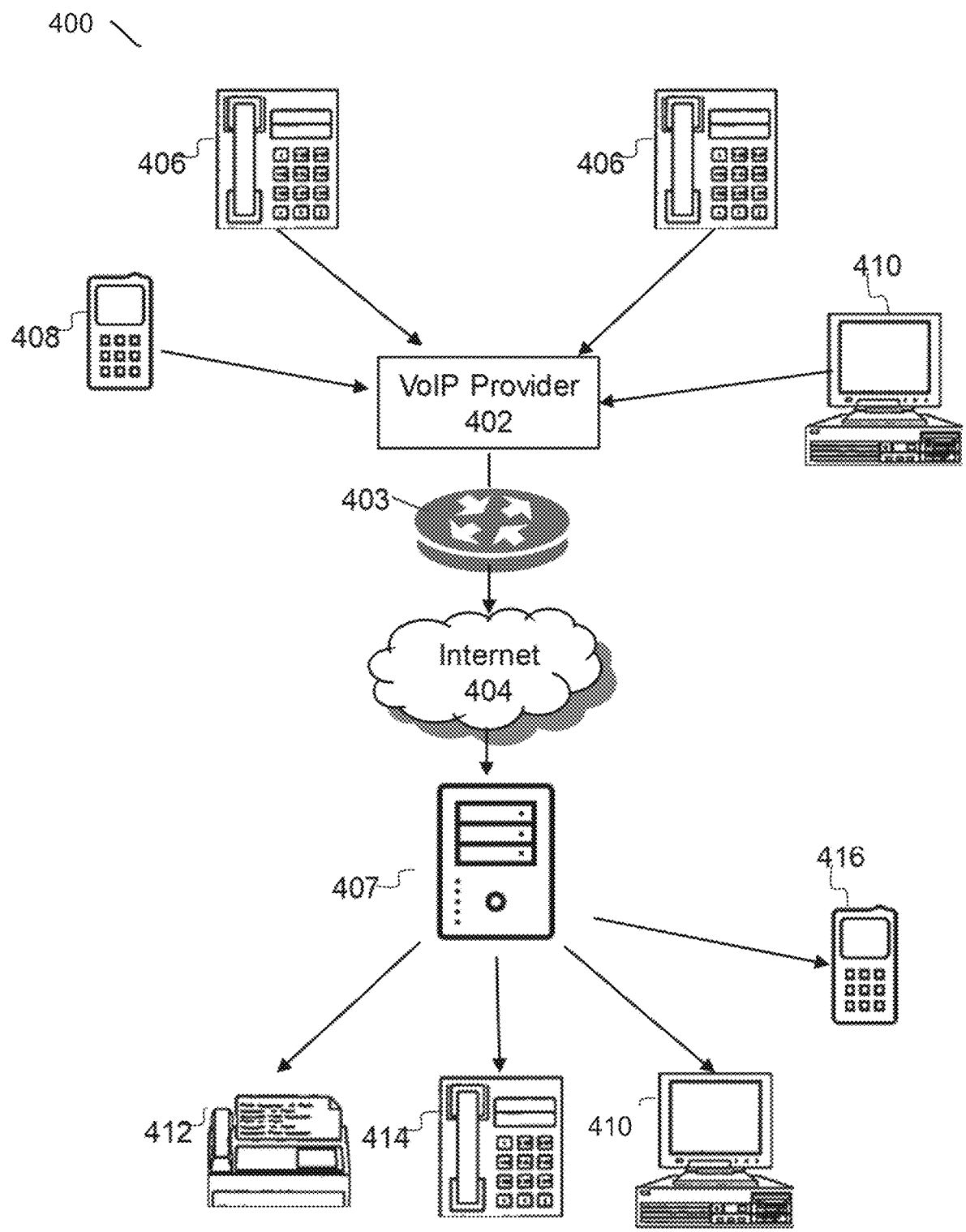
FIG. 4 is a simplified block diagram of an embodiment of a VoIP network, on which the SIP telephony provider described in FIG. 1 may be implemented, according to various aspects of the present disclosure.

Method 300 starts with step 302, at which a communication request having a destination for a second end user is received from a first end user, to establish a communication session between the first end user and the second end user. For example, a UA (endpoint) in any of the media servers 205a-c in FIG. 2 may initiate a VoIP call destined at another endpoint in the far end, e.g., the VoIP phone 115 through the external network 110 shown in FIG. 1. The endpoint may correspond to a client application running on a computer 412 and the far end endpoint may correspond to any of the devices 412, 414 and 416, which may be connected to the endpoint 412 through a VoIP call via the Internet 404, as shown in FIG. 4.

At step 304, a first routing path between the first end user and the second end user is determined. For example, MRC 102 may determine to route media traffic (RTP packets) 201 via UA 215a in media server A 205a, which may in turn forward the media traffic 201 to the external network 110 via the SBC 108.

At step 306, a first audio quality metric is determined following a first plurality VoIP data packets that are exchanged with the first end user via the first routing path during the communication session. For example, at the setup of the VoIP call, call parameters such as the RTP socket type, coding/compression algorithm, payload size, etc., are negotiated for the VoIP call. Based on these parameters and additional performance indicators such as packet loss and jitter, the CQMS may be computed.

At step 310, method 300 determines whether the audio quality metric satisfies a condition, e.g., by comparing the audio quality metric against a pre-defined threshold. For example, when CQMS is adopted as the audio quality metric, a higher-than-threshold CQMS indicates the audio quality is unsatisfactory, and thus method 300 proceeds to step 314. Otherwise, when the CQMS is lower than the threshold, indicating the audio quality is satisfactory at step 310, method 300 proceeds to step 316. For another example, when a different kind of audio quality metric is used, e.g., the audio quality metric is defined as proportional to the level of audio quality, a lower-than-threshold quality metric indicates the audio quality is unsatisfactory, and thus method 300 proceeds to step 314. Otherwise, when the audio quality metric is greater than the threshold, indicating the audio quality is satisfactory at step 310, method 300 proceeds to step 316.

At step 314, a second plurality of VoIP data packets are redirected from the first end user through a second routing path while the communication session is ongoing 314. For example, as shown in FIG. 2, the media traffic 202 including subsequent RTP packets of the VoIP call may be redirected to UA 215b in media server B 205b, which may in turn forward the media traffic 202 to SBC 108.

At step 315, optionally (as illustrated by the dashed line), the VoIP parameters may be modified while the communication session is ongoing. For example, upon the endpoint redirection from step 314, a new call leg is formed, based on which VoIP parameters may be re-negotiated. Method 300 may then proceed to step 324 in FIG. 3B.

Back to step 316, when the audio quality metric is satisfactory, method 300 may continue the communication session and monitor the audio quality. Method 300 may then proceed to step 306, e.g., to repeatedly, periodically, or constantly determine the audio quality metric in real time.

Continuing on with FIG. 3B, at step 322, the modified VoIP parameters and/or the endpoint redirection to the different routing path may be stored. For example, changes made to call parameters to improve call quality may be tracked, and such tracking may include the change in call quality resulting from the parameter change. If a parameter change is made that results in improved call quality (e.g., with an improved CQMS score below the defined threshold), no further parameter change is needed. If no parameter change attempt results in a satisfactory call quality improvement (e.g., with an improved CQMS below the defined threshold), the parameters that resulted in the best call quality (e.g., the lowest CQMS score) may be used.

At step 324, a resulting audio quality metric associated with subsequent VoIP data packets in accordance with the modified VoIP parameters upon the endpoint redirection is monitored and stored. For example, a CQMS is re-computed every time when an endpoint redirection occurs and every 5 seconds thereafter.

At step 326, the total number of times when at least one VoIP parameter has been modified, or an endpoint redirection has occurred is determined. When the total number of times has not reached the maximum allowable times of change at step 330, method 300 proceeds to step 336, at which the audio quality continues to be monitored, and method 300 proceeds to 310 to evaluate the monitored audio quality metric.

When the total number of times has reached the maximum allowable times of change at step 330, no more endpoint redirection can be performed. Method 300 proceeds to step 334, at which the subsequent VoIP data packets are redirected to the previously tried endpoint that yields the best audio quality metric among the set of endpoints that have been previously redirected.

At step 335, the communication session is continued with the endpoint and corresponding VoIP parameters associated with the best audio quality metric.

In some embodiments, at steps 315 or 335, historical data may be used to configure or modify VoIP parameters/characteristics that may yield the best quality outcome. In a traditional soft-switch approach, the call control may be maintained by the soft switch and the audio or video media may travel more directly between the two parties of the call, resulting in only one call leg. In this case, historical data may be used to predict the best quality outcome and to set the initial call characteristics for a call leg from Area A to Area B (in the case of only one call leg). In the case of two call legs, historical data may predict the characteristics needed for best quality outcome for a call leg from Area A to the selected media server (e.g., one of 205a-c in FIG. 2), and a different set of call characteristics for the call leg from the selected media server to Area B. Sometimes the two sets of call characteristics may be in conflict.

When conflicts arise between the optional parameter configurations of two or more call legs that must join at least one media server, several methods may be used to resolve the conflict. For example, the VoIP parameter modification upon an endpoint redirection may include any combination of (or optionally follow the hierarchy of actions below):

1. Changing routes. For example, the new route may have a greater available bandwidth, or the routers and firewalls encountered may have less congestion. Changing the IP carrier used for the call is likely to change the route and the set of routers and firewalls through which the call media traverses.
2. Decreasing packet overhead. For example, there may be benefits to sending smaller packets at more-frequent intervals, but the 40 bytes of TCP packet overhead may be burdensome when only 20 bytes of media are in the packet—a 200% packet overhead. By sending 160 bytes of media per packet at longer intervals the overhead is reduced to 25%. For a single call from Area A to Area B, the benefit of decreased packet overhead may not be significant, but for a large number of calls between the two areas, the decreased packet overhead may result in significant call quality improvement.
3. Changing the socket type. For example, the new socket type may be treated according to different rules by routers and firewalls along the route, which may result in improved call quality. This may require an endpoint redirection or other call control sequence.
4. Changing all calls connected from Area A to Area B to a lower-bit-rate vocoder. This may require Reinvites or other call control sequences.
5. Changing other parameters as may be available.

FIG. 4 is a simplified block diagram of an embodiment of a VoIP network 400, on which embodiments described in FIGS. 1-3B may be implemented, according to various aspects of the present disclosure. A "communication network" as used herein can include any facility or system server suitable for receiving and recording electronic communications from customers. Such customer communications can include, for example, telephone calls, facsimile transmissions, e-mails, web interactions, voice over IP ("VoIP") and video. Various specific types of communications contemplated through one or more of these channels include, without limitation, email, SMS data (e.g., text), tweet, instant message, web-form submission, smartphone app, social media data, and web content data (including but not limited to internet survey data, blog data, microblog data, discussion forum data, and chat data), etc. In some embodiments, the communications can include customer tasks, such as taking an order, making a sale, responding to a complaint, etc. In various aspects, real-time communication, such as voice, video, or both, is preferably included. It is contemplated that these communications may be transmitted by and through any type of telecommunication device and over any medium suitable for carrying data. For example, the communications may be transmitted by or through telephone lines, cable, or wireless communications.

As shown in FIG. 4, the VoIP network 400 of the present disclosure is adapted to receive and record varying electronic communications and data formats that represent an interaction that may occur between different callers, e.g., end-users operating the personal communication devices 406, 408, 410, 412, 414 or 416. In the illustrated embodiment, callers may initiate a communication session with agents associated with the VoIP network 400 through a Smartphone 408, one or more VoIP phones 406, a computer 410, and/or the like. The initiated communication session, e.g., via the SIP protocol, may be operated by the VoIP provider 402 that converts audio data to VoIP data packets, e.g., RTP packets, etc. For example, the VoIP provider 402 may utilize IP telephony, which integrates audio and video stream control with legacy telephony functions. In some embodiments, the VoIP provider 103 is supported by SIP, and may host a plurality of media servers as shown by the SIP telephony provider 100 shown in FIG. 1. The VoIP provider 402 is further communicatively coupled to the Internet 404 via hardware and software components, e.g., by a gateway or a router 403 that routes the VoIP packets to Internet 404. One of ordinary skill in the art would recognize that the connections between the VoIP provider 403 and external networks such as the Internet 404 as illustrated by FIG. 4 have been simplified for the sake of clarity and the VoIP network 400 may include various additional and/or different software and hardware networking components such as routers, switches, gateways, network bridges, hubs, and legacy telephony equipment.

In some embodiments, the VoIP provider 402, through Internet 404, may process VoIP calls from personal devices 406, 408 and 410 to reach a far end device such as personal devices 412, 414 and 416. For example, a call from an IP telephony client 409, 408 and 410 within the VoIP network 400 to a conventional telephone 414, a fax machine 412, a cellphone 416, or other legacy telephony devices would be routed, through Internet 104, to an IP/PBX-PSTN gateway 407, which in turn translates a VoIP protocol (e.g., SIP) to conventional telephone protocol and route the call to its destination at one of the devices 412, 414 and 416.

The VoIP provider 402 may monitor the call audio quality and route or re-direct VoIP packets to ensure the call audio quality of VoIP calls, as described in FIGS. 1-3B.

Figure 5:
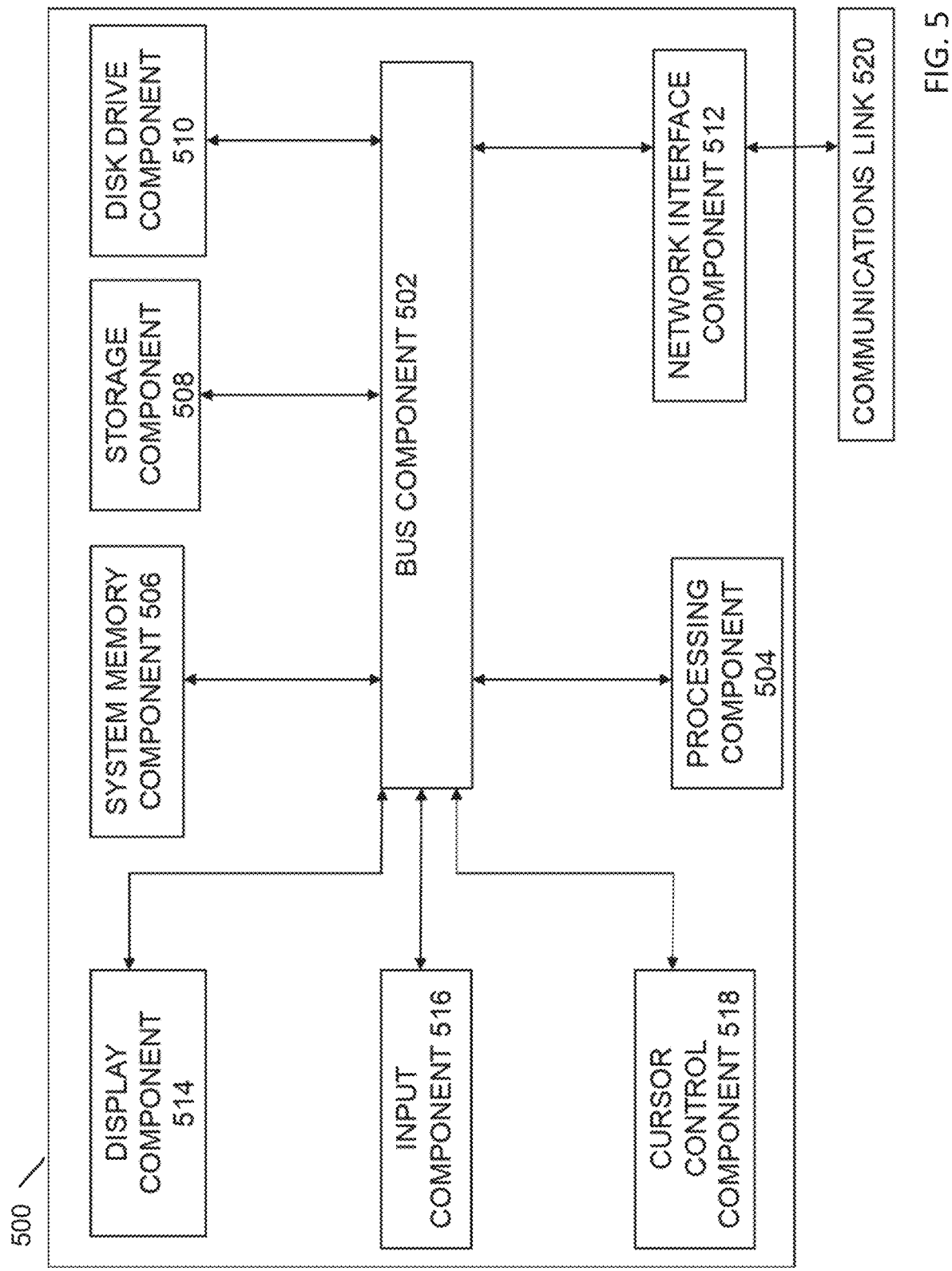
FIG. 5 is a block diagram of a computer system suitable for implementing one or more components in FIGS. 1 and 4 to perform the process or method shown in FIGS. 2 and 3A-3B, according to one embodiment of the present disclosure.

FIG. 5 is a block diagram of a computer system 500 suitable for implementing one or more components in FIGS. 1 and 4 to perform the process or method shown in FIGS. 2 and 3A-3B, according to one embodiment of the present disclosure. System 500, such as part a computer and/or a network server, includes a bus 502 or other communication mechanism for communicating information, which interconnects subsystems and components, including one or more of a processing component 504 (e.g., processor, micro-controller, digital signal processor (DSP), etc.), a system memory component 506 (e.g., RAM), a static storage component 508 (e.g., ROM), a network interface component 512, a display component 514 (or alternatively, an interface to an external display), an input component 516 (e.g., keypad or keyboard), and a cursor control component 518 (e.g., a mouse pad). The MRC 102, media servers 105a-c (or 205a-c), the VoIP provider 402, and/or other components or modules described in FIGS. 1 and 4 may have similar components as system 500.

In accordance with embodiments of the present disclosure, system 500 performs specific operations by processor 504 executing one or more sequences of one or more instructions contained in system memory component 506. Such instructions may be read into system memory component 506 from another computer readable medium, such as static storage component 508. For example, the storage component 508 may store instructions to determine an audio quality metric and evaluate whether the audio quality metric is satisfactory. The storage component 508 further stores instructions to redirect VoIP data packets from a previous endpoint to another endpoint and subsequently modify VoIP parameters when the audio quality metric is unsatisfactory. In other embodiments, hard-wired circuitry may be used in place of or in combination with software instructions for implementation of one or more embodiments of the disclosure.

Logic may be encoded in a computer readable medium, which may refer to any medium that participates in providing instructions to processor 504 for execution. Such a medium may take many forms, including but not limited to, non-volatile media, volatile media, and transmission media. In various implementations, volatile media includes dynamic memory, such as system memory component 506, and transmission media includes coaxial cables, copper wire, and fiber optics, including wires that comprise bus 502. Memory may be used to store visual representations of the different options for searching or auto-synchronizing. In one example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by system 500. In various other embodiments, a plurality of systems 500 coupled by communication link 520 (e.g., external network 110 of FIG. 1, LAN, WLAN, PTSN, or various other wired or wireless networks) may perform instruction sequences to practice the disclosure in coordination with one another. Computer system 500 may transmit and receive messages, data, information and instructions, including one or more programs (i.e., application code) through communication link 520 and communication interface 512. For example, the communication link 520 may be communicatively coupled to and send VoIP packets to the external network 110 of FIG. 1 via communication interface 512. Received program code may be executed by processor 504 as received and/or stored in disk drive component 510 or some other non-volatile storage component for execution.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of ordinary skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

The Abstract at the end of this disclosure is provided to comply with 37 C.F.R. § 1.72(b) to allow a quick determination of the nature of the technical disclosure. It is submitted with the understanding that it will not be used to interpret or limit the scope or meaning of the claims.

What is claimed is:

1. A system for dynamic voice-over-Internet-Protocol (VoIP) audio quality management, the system comprising:
a processor and a computer-readable medium operably coupled thereto, the computer-readable medium comprising a plurality of instructions stored in association therewith that are accessible to, and executable by, the processor, in conjunction with a network, to perform operations which comprise:
receiving, from a first end user, a communication request having a destination for a second end user to establish a communication session between the first end user and the second end user;
determining a first routing path between the first end user and the second end user;
establishing, in accordance with a set of VoIP parameters, the communication session via the first routing path;
determining a first audio quality metric following a first plurality of VoIP data packets that are transmitted from the first end user via the first routing path during the communication session;
redirecting a second plurality of VoIP data packets, in response to determining that the first audio quality metric fails to satisfy a condition, from the first end user through a second routing path while the communication session is ongoing;
determining a second audio quality metric associated with the second plurality of VoIP data packets that are being transmitted via the second routing path in accordance with the modified one or more VoIP parameters; and
modifying, in response to determining that the second audio quality metric fails to satisfy the condition, one or more VoIP parameters, or redirecting a third plurality of VoIP data packets from the first end user through a third routing path while the communication session is ongoing.

2. The system of claim 1, wherein the second end user corresponds to an endpoint within a cluster of media servers, and the second routing path is configured to route VoIP data packets via a different endpoint within the cluster of media servers.

3. The system of claim 1, wherein the operations further comprise:
modifying, in response to determining that the first audio quality metric fails to satisfy the condition, one or more VoIP parameters from the first set of VoIP parameters during the communication session, wherein the one or more VoIP parameters include one or more of:
a Real Time Protocol (RTP) socket type;
an audio encoding or compression method used to encode or compress the VoIP data packets;
a packet payload size;
an Internet Protocol (IP) address associated with the second end user; and
a selection of an Internet Service Provider (ISP).

4. The system of claim 3, wherein the operations further comprise:

further modifying VoIP parameters, or redirecting subsequent VoIP data packets from the first end user through a different routing path while the communication session is ongoing until a monitored audio quality metric associated with VoIP data packets being transmitted through the different routing path satisfies the condition.

5. The system of claim 3, wherein the operations further comprise:
tracking a modification of VoIP parameters or a redirection to a different routing path;
monitoring a resulting audio quality metric associated with subsequent VoIP data packet in accordance with the modification of VoIP parameters or the redirection to a different routing path;
determining a total number of times that at least one VoIP parameter has been modified, or the redirection to the different routing path has occurred; and
in response to determining that the total number of times reaches a maximum allowable times of change, performing one or more of:
(i) redirecting the subsequent VoIP data packets, via at least one routing path associated with a best audio quality metric among a set of routing entities that have been previously redirected to, and
(ii) continuing the communication session with VoIP parameters associated with the best audio quality metric among different configurations of VoIP parameters that have been previously applied.

6. The system of claim 1, wherein the first audio quality metric is determined based on one or more of:
an average jitter or packet loss over a Real Time Control Protocol reporting period, a duration of jitter, and a total number of lost packets.

7. The system of claim 1, wherein the condition includes an audio quality threshold that is statistically configured based on one or more of carrier information for the communication session, a location of the second end user, and a country or area code of the second end user.

8. The system of claim 7, wherein the audio quality threshold is dynamically configured based at least in part on network bandwidth usage reports.

9. The system of claim 1, wherein the operations further comprise:
progressively modifying the one or more VoIP parameters by performing any combination of:
changing an IP carrier;
decreasing packet overhead;
changing a socket type; and
changing a vocoder for all VoIP calls between a first area with a second area.

10. A method for dynamic voice-over-Internet-Protocol (VoIP) audio quality management, the method comprising:
receiving, from a first end user, a communication request having a destination for a second end user to establish a communication session between the first end user and the second end user;
determining a first routing path between the first end user and the second end user;
establishing, in accordance with a set of VoIP parameters, the communication session via the first routing path;
determining a first audio quality metric associated with a first plurality of VoIP data packets that are transmitted from the first end user via the first routing path during the communication session;
redirecting, in response to determining that the first audio quality metric fails to satisfy a condition, a second plurality of VoIP data packets from the first end user through a second routing path while the communication session is ongoing;

determining a second audio quality metric associated with the second plurality of VoIP data packets that are being transmitted via the second routing path in accordance with the modified one or more VoIP parameters;

modifying, in response to determining that the second audio quality metric fails to satisfy the condition, one or more VoIP parameters, or redirecting a third plurality of VoIP data packets from the first end user through a third routing path while the communication session is ongoing; and continuing modifying VoIP parameters, or redirecting subsequent VoIP data packets from the first end user through a different routing path while the communication session is ongoing until a monitored audio quality metric associated with VoIP data packets being transmitted through the different routing path satisfies the condition.

11. The method of claim 10, further comprising:
modifying, in response to determining that the first audio quality metric fails to satisfy the condition, one or more VoIP parameters from the first set of VoIP parameters during the communication session, and wherein the one or more VoIP parameters include one or more of:
a Real Time Protocol (RTP) socket type;
an audio encoding or compression method used to encode or compress the VoIP data packets;
a packet payload size;
an Internet Protocol (IP) address associated with the second end user; and
a selection of an Internet Service Provider (ISP).

12. The method of claim 10, wherein the operations further comprise: tracking a modification of VoIP parameters or a redirection to a different routing path; monitoring a resulting audio quality metric associated with subsequent VoIP data packet in accordance with the modification of VoIP parameters or the redirection to a different routing path; determining a total number of times that at least one VoIP parameter has been modified, or the redirection to the different routing path has occurred; in response to determining that the total number of changes reaches a maximum allowable number of changes, performing one or more of: (i) redirecting the subsequent VoIP data packets via at least one routing path associated with a best audio quality metric among a set of routing entities that have been previously redirected to, or (ii) continuing the communication session with VoIP parameters associated with the best audio quality metric among different configurations of VoIP parameters that have been previously applied.

13. The method of claim 10, wherein the first audio quality metric is determined based on one or more of:
an average jitter or packet loss over a Real Time Control Protocol reporting period, a duration of jitter, and a total number of lost packets.

14. The method of claim 10, further comprising:
progressively modifying the one or more VoIP parameters by performing any combination of:
changing an IP carrier;
decreasing packet overhead;
changing a socket type; and
changing a vocoder for all VoIP calls between a first area with a second area.

15. A non-transitory computer-readable medium having stored thereon computer-readable instructions executable by a processor, in conjunction with a network, to perform operations which comprise:
receiving, from a first end user, a communication request having a destination for a second end user to establish a communication session between the first end user and the second end user;

determining a first routing path between the first end user and the second end user;

establishing, in accordance with a set of VoIP parameters, the communication session via the first routing path;

determining a first audio quality metric associated with a first plurality of VoIP data packets that are transmitted from the first end user via the first routing path during the communication session;

redirecting, in response to determining that the first audio quality metric fails to satisfy the condition, a second plurality of VoIP data packets from the first end user through a second routing path while the communication session is ongoing;

determining a second audio quality metric associated with the second plurality of VoIP data packets that are being transmitted via the second routing path in accordance with the modified one or more VoIP parameters;

modifying, in response to determining that the second audio quality metric fails to satisfy the condition, one or more VoIP parameters, or redirecting a third plurality of VoIP data packets from the first end user through a third routing path while the communication session is ongoing; and continuing modifying VoIP parameters, or redirecting subsequent VoIP data packets from the first end user through a different routing path while the communication session is ongoing until a monitored audio quality metric associated with VoIP data packets being transmitted through the different routing path satisfies the condition.

16. The non-transitory computer-readable medium of claim 15, wherein the operations further comprise:
modifying, in response to determining that the first audio quality metric fails to satisfy the condition, one or more VoIP parameters from the first set of VoIP parameters during the communication session, and
wherein the one or more VoIP parameters include any of:
a Real Time Protocol (RTP) socket type;
an audio encoding or compression method used to encode or compress the VoIP data packets;
a packet payload size;
an Internet Protocol (IP) address associated with the second end user; and
a selection of an Internet Service Provider (ISP).

17. The non-transitory computer-readable medium of claim 15, wherein the operations further comprise:
tracking a modification of VoIP parameters or a redirection to a different routing path;
monitoring a resulting audio quality metric associated with subsequent VoIP data packet in accordance with the modification of VoIP parameters or the redirection to a different routing path;
determining a total number of times that at least one VoIP parameter has been modified, or the redirection to the different routing path has occurred;
in response to determining that the total number of times reaches a maximum allowable times of change, performing one or more of:

(i) redirecting the subsequent VoIP data packets via at least one routing path associated with a best audio quality metric among a set of routing entities that have been previously redirected to, or (ii) continuing the communication session with VoIP parameters associated with the best audio quality metric among different configurations of VoIP parameters that have been previously applied.

18. The non-transitory computer-readable medium of claim 15, wherein the operations further comprise:
in response to determining that one or more audio quality metrics corresponding to one or more calls that share a common carrier, a common Internet service provider, or a common route, redirecting the one or more calls via a different carrier, a different Internet service provider or a different route.

19. A system for dynamic voice-over-Internet-Protocol (VoIP) audio quality management, the system comprising:
a processor and a computer-readable medium operably coupled thereto, the computer-readable medium comprising a plurality of instructions stored in association therewith that are accessible to, and executable by, the processor, in conjunction with a network, to perform operations which comprise:
  receiving, from a first end user, a communication request having a destination for a second end user to establish a communication session between the first end user and the second end user;
  determining a first routing path between the first end user and the second end user;
  establishing, in accordance with a set of VoIP parameters, the communication session via the first routing path;
  determining a first audio quality metric following a first plurality of VoIP data packets that are transmitted from the first end user via the first routing path during the communication session;
  redirecting a second plurality of VoIP data packets, in response to determining that the first audio quality metric fails to satisfy a condition, from the first end user through a second routing path while the communication session is ongoing;
  modifying, in response to determining that the first audio quality metric fails to satisfy the condition, one or more VoIP parameters from the first set of VoIP parameters during the communication session, wherein the one or more VoIP parameters include one or more of:
    a Real Time Protocol (RTP) socket type;
    an audio encoding or compression method used to encode or compress the VoIP data packets;
    a packet payload size;
    an Internet Protocol (IP) address associated with the second end user; and
    a selection of an Internet Service Provider (ISP); and
  further modifying VoIP parameters, or redirecting subsequent VoIP data packets, from the first end user through a different routing path while the communication session is ongoing until a monitored audio quality metric associated with VoIP data packets being transmitted through the different routing path satisfies the condition.

20. A system for dynamic voice-over-Internet-Protocol (VoIP) audio quality management, the system comprising:
a processor and a computer-readable medium operably coupled thereto, the computer-readable medium comprising a plurality of instructions stored in association therewith that are accessible to, and executable by, the processor, in conjunction with a network, to perform operations which comprise:
  receiving, from a first end user, a communication request having a destination for a second end user to establish a communication session between the first end user and the second end user;
  determining a first routing path between the first end user and the second end user;
  establishing, in accordance with a set of VoIP parameters, the communication session via the first routing path;
  determining a first audio quality metric following a first plurality of VoIP data packets that are transmitted from the first end user via the first routing path during the communication session;
  redirecting a second plurality of VoIP data packets, in response to determining that the first audio quality metric fails to satisfy a condition, from the first end user through a second routing path while the communication session is ongoing;
  modifying, in response to determining that the first audio quality metric fails to satisfy the condition, one or more VoIP parameters from the first set of VoIP parameters during the communication session, wherein the one or more VoIP parameters include one or more of:
    a Real Time Protocol (RTP) socket type;
    an audio encoding or compression method used to encode or compress the VoIP data packets;
    a packet payload size;
    an Internet Protocol (IP) address associated with the second end user; and
    a selection of an Internet Service Provider (ISP);
  tracking a modification of VoIP parameters or a redirection to a different routing path;
  monitoring a resulting audio quality metric associated with subsequent VoIP data packet in accordance with the modification of VoIP parameters or the redirection to a different routing path;
  determining a total number of times that at least one VoIP parameter has been modified, or the redirection to the different routing path has occurred; and
  in response to determining that the total number of times reaches a maximum allowable times of change, performing one or more of:
    (i) redirecting the subsequent VoIP data packets, via at least one routing path associated with a best audio quality metric among a set of routing entities that have been previously redirected to, and
    (ii) continuing the communication session with VoIP parameters associated with the best audio quality metric among different configurations of VoIP parameters that have been previously applied.

21. A non-transitory computer-readable medium having stored thereon computer-readable instructions executable by a processor, in conjunction with a network, to perform operations which comprise:
  receiving, from a first end user, a communication request having a destination for a second end user to establish a communication session between the first end user and the second end user;
  determining a first routing path between the first end user and the second end user;
  establishing, in accordance with a set of VoIP parameters, the communication session via the first routing path;

determining a first audio quality metric associated with a first plurality of VoIP data packets that are transmitted from the first end user via the first routing path during the communication session;

redirecting, in response to determining that the first audio quality metric fails to satisfy the condition, a second plurality of VoIP data packets from the first end user through a second routing path while the communication session is ongoing;

tracking a modification of VoIP parameters or a redirection to a different routing path;

monitoring a resulting audio quality metric associated with subsequent VoIP data packet in accordance with the modification of VoIP parameters or the redirection to a different routing path;

determining a total number of times that at least one VoIP parameter has been modified, or the redirection to the different routing path has occurred; and in response to determining that the total number of times reaches a maximum allowable times of change, performing one or more of:
  (i) redirecting the subsequent VoIP data packets via at least one routing path associated with a best audio quality metric among a set of routing entities that have been previously redirected to, or
  (ii) continuing the communication session with VoIP parameters associated with the best audio quality metric among different configurations of VoIP parameters that have been previously applied.

22. A non-transitory computer-readable medium having stored thereon computer-readable instructions executable by a processor, in conjunction with a network, to perform operations which comprise:

receiving, from a first end user, a communication request having a destination for a second end user to establish a communication session between the first end user and the second end user;

determining a first routing path between the first end user and the second end user;

establishing, in accordance with a set of VoIP parameters, the communication session via the first routing path;

determining a first audio quality metric associated with a first plurality of VoIP data packets that are transmitted from the first end user via the first routing path during the communication session;

redirecting, in response to determining that the first audio quality metric fails to satisfy the condition, a second plurality of VoIP data packets from the first end user through a second routing path while the communication session is ongoing; and in response to determining that one or more audio quality metrics corresponding to one or more calls that share a common carrier, a common Internet service provider, or a common route, redirecting the one or more calls via a different carrier, a different Internet service provider or a different route.

\* \* \* \* \*